United States Patent [19]

Daily et al.

[11] Patent Number: 4,653,935

[45] Date of Patent: Mar. 31, 1987

[54] THERMOCOUPLE CONTAINMENT CHAMBER

[76] Inventors: Jeffrey N. Daily, 4701 Hampden Rd., Corona del Mar, Calif. 92625; Bruce B. Orr, 4617 Mimosa St., Bellaire, Tex. 77401; Guillermo J. Martinez, 2002 Middle Creek Dr., Kingwood, Tex. 77339

[21] Appl. No.: 733,604

[22] Filed: May 13, 1985

[51] Int. Cl.[4] .............................................. G01L 1/14
[52] U.S. Cl. ..................... 374/208; 374/137; 374/110; 136/221; 136/230
[58] Field of Search ......................... 374/3, 29, 30, 110, 374/111, 112, 113, 116, 135, 136, 137, 140, 143, 144, 147, 148, 163, 166, 179, 208; 136/221, 229, 230, 235; 373/110, 136

[56] References Cited

U.S. PATENT DOCUMENTS

| | | | |
|---|---|---|---|
| 1,615,503 | 1/1927 | Brown | 374/179 |
| 1,969,141 | 8/1934 | McDonald | 374/136 |
| 2,694,930 | 11/1954 | Lamb et al. | 374/116 |
| 2,839,594 | 6/1958 | Schneidersmann | 136/221 |
| 3,416,972 | 12/1968 | Haselton et al. | 136/230 |
| 3,468,723 | 9/1969 | Lambert | 136/221 |
| 3,516,873 | 6/1970 | Bonkowski et al. | 136/221 |
| 3,681,990 | 8/1972 | Barrett et al. | 136/221 |
| 3,923,552 | 12/1975 | Parris | 374/179 |
| 4,028,139 | 6/1977 | Smith et al. | 374/110 |
| 4,088,509 | 5/1978 | Blaze, Jr. | 136/230 |
| 4,135,053 | 1/1979 | Kastilahn et al. | 373/110 |
| 4,376,227 | 3/1983 | Hilborn | 136/230 |
| 4,385,197 | 5/1983 | Schwagerman | 136/221 |
| 4,410,756 | 10/1983 | Schwagerman | 374/110 |
| 4,412,090 | 10/1983 | Kawate et al. | 374/137 |
| 4,445,788 | 5/1984 | Twersky et al. | 374/110 |
| 4,510,343 | 4/1985 | Sivyer | 374/208 |
| 4,511,264 | 4/1985 | Bucha et al. | 374/135 |

Primary Examiner—Charles Frankfort
Assistant Examiner—Thomas B. Will
Attorney, Agent, or Firm—George F. Bethel; Patience K. Bethel

[57] ABSTRACT

A thermocouple containment chamber for use in conjunction with a high pressure vessel wherein such thermocouples are emplaced within an elongated conduit which receives a plurality of thermocouples for sensing temperatures to determine the temperature or reaction rate within the high pressure vessel in which they are emplaced. The conduit is secured to the vessel through the use of a flanged securement that in turn is welded to a concentric reducer with the thermocouples extending therefrom into a containment chamber of this invention. The containment chamber of this invention incorporates at least one access means in the form of a high pressure flanged cover permitting access to the containment chamber for the thermocouples so that they can be changed and serviced, and incorporates a valve for relieving pressure, as well as a pressure gauge. The containment chamber includes a wall with a plurality of openings therethrough for receipt of the thermocouples which are in turn secured by high pressure fittings for connection to electrical connections for providing an output to be read as to the temperatures being sensed by the thermocouples.

27 Claims, 11 Drawing Figures

THERMOCOUPLE CONTAINMENT CHAMBER

FIELD OF THE INVENTION

The field of this invention lies within the art of monitoring high pressure vessels and other closed vessels such as reaction vessels used in hydrocrackers, hydrogen reactors, catalytic reactors or catalytic crackers. The temperatures are monitored by thermocouples which are emplaced within the reactor vessel at different locations in order to sense the temperatures in the vessel. The thermocouples extend from the vessel and are sealed to prevent the escape of high pressure or the breakdown of the seal.

THE PRIOR ART

The prior art of high pressure reaction vessels, such as hydrocrackers, hydrogen reactors, catalytic reactors, catalytic crackers for various high temperature and high pressure reactions, incorporates the utilization of temperature sensing means. The temperature sensing means are usually emplaced within the reaction vessel in order to sense various temperatures within the vessel at different levels, as well as different areas.

It is well known that reactions occur at different rates depending upon temperature. Accordingly, it is desirable to sense the temperature within a reaction vessel to determine whether or not the correct reaction is taking place. To this end, the temperatures sensed at different points within the reaction vessel are important in providing the personnel monitoring the reaction with information for providing for the proper output of the reaction vessel. The prior art for sensing temperatures has generally relied upon thermocouples being emplaced within various locations at a particular interior depth or orientation within the reaction vessel.

The temperature sensing means in the way of thermocouples are emplaced within a pipe generally extending into the reaction vessel for a significant length. Temperatures in the reaction vessel are sensed and the output is read for providing personnel with the knowledge to enhance the efficiency of the reaction.

It has been common to pass the pipe containing the thermocouples upwardly to a flange or sealing area within the reaction vessel. At such a point, the pipe is sealed and led outwardly from the reaction vessel. Thus, there is only one seal between the thermocouples, and the exterior of the vessel. Oftentimes, as can be appreciated, this is the weakest link in the vessel and is subject to being separated from its relationship with the pressure vessel. This particular problem has been encountered in some petrochemical reaction vessels, such as hydrocrackers, wherein the terminal box and the attachment means for the thermocouples have been blown away from the reaction vessel in an overpressure situation.

It is believed that until this invention, there has not been a suitable means for containment and safety as to the thermocouples used in a reaction vessel. This is particularly true as to the portion of thermocouples which extend from the reaction vessel and are connected to a terminal block for an electrical output reading.

In order to provide for an improved reaction vessel, thermocouple containment means, as well as thermocouple reading means, this invention has been made by the inventors hereof to enhance the overall aspects of the foregoing. In particular, the invention incorporates a long extended conduit which is received within the interior of the reaction vessel. The extended conduit extends downwardly and has a number of heat transfer blocks along the length thereof, in order to receive temperature readings at different thermocouple areas for relay and connection to a terminal block for providing the output thereof.

The conduit containing the thermocouples extends upwardly to a flanged area and then bells out in a concentric reducer to a containment chamber. The containment chamber incorporates a spring retainer body for driving the thermocouples downwardly for close contact with the heat sensing blocks. The output from the heat sensing blocks is received through the thermocouples and passed upwardly through the chamber as an electrical ouput to an electrical terminal area.

The containment chamber incorporates at least one service opening through a T or a second service opening by means of a cross relationship. The opening allows for access to the chamber in which the thermocouples are received and held in place by the spring retainers that drive the thermocouples against heat sensing members or blocks.

The thermocouples pass outwardly through a substantial wall of the containment chamber to an electrical terminal block area. The containment chamber is secured into a closed position by means of at least one closure in the form of a heavy duty flange and cover which are bolted together.

The net result is one wherein the high pressures of the reaction vessel are not allowed to directly affect the outer areas without first of all passing through at least two walls. The first wall is the wall of the conduit in which the thermocouples are placed and the second is from the conduit through the containment chamber. Thus, a safe and inventive solution has been provided herein for the containment of thermocouples within reaction vessels to provide for safety and efficient maintenance of the thermocouples within the vessel.

As a consequence of the foregoing, this invention is a substantial step over the prior art and should be read as such in light of the following specification as firstly summarized hereinafter and specified in detail thereafter.

SUMMARY OF THE INVENTION

In summation, this invention comprises a containment chamber for a high pressure chemical reactor sensing means, such as thermocouples emplaced within said high pressure chemical reactor and which extend outwardly for sensing temperatures or other readings within the reactor.

More particularly, it incorporates a high pressure vessel having substantially thick walls which are provided with an opening. Through the opening, a conduit extends in which a plurality of thermocouples are emplaced. The thermocouples extend downwardly to a number of heat sensing blocks. The thermocouples are exposed to each heat sensing block at a particular level witin the reaction vessel in order to sense the temperatures within the reaction vessel at those respective levels.

The thermocouples extend through the conduit upwardly and into a containment chamber provided by a T or a cross. The T or the cross forming the containment chamber has a means for securing the T or the cross to the pressure vessel in the form of flanges supporting the T or the cross at a concentric reducer.

The T or cross configuration as the case may be, depending upon the desirability of one or the other, provides a containment chamber in the center of the T or the Cross for the thermocouples to extend upwardly therein and be held in place.

Within the containment chamber are a plurality of spring retainer bodies to drive the thermocouples into close contact with a number of sensing blocks within the conduit. The spring load of the spring retainer bodies cause the thermocouples to drive downwardly against the sensing blocks and provide for a reading therefrom as to the temperature thereof.

At either side of the cross or on one side of the T, a flange and cover is provided. The flange and cover allow for removal of the cover for servicing of the thermocouple in the containment chamber, including the spring retainer body. The upper portion of the T or cross has a substantially thick wall which has been drilled to allow for the passage of the thermocouples downwardly therethrough which are sealed on one side thereof by high pressure fittings. The electrical outputs from the thermocouples are connected to a series of terminal blocks so that a reading can be provided therefrom.

A first relief valve and a pressure gauge provide for a pressure reading and relief in the containment chamber. In addition thereto, a second pressure reading means in the way of a pressure sensor having an electrical output means passes through a major wall of the T or cross in order to allow for an electrical output therefrom which can be read at a remote location.

All the foregoing provides for a containment chamber which creates a means for containing high pressures that escape through a breakdown, deterioration, or other reasons through the wall of the conduit in which the thermocouples are emplaced, thus enhancing the overall serviceability and safety of thermocouple usage within high pressure chemical reaction vessels.

BRIEF DESCRIPTION OF THE DRAWINGS

The invention will be more clearly understood by reference to the description below taken in conjunction with the accompanying drawings wherein:

FIG. 1 shows a partially broken away perspective view of the pressure vessel that this invention is used with;

DESCRIPTION OF THE PREFERRED EMBODIMENTS

Figure 1:
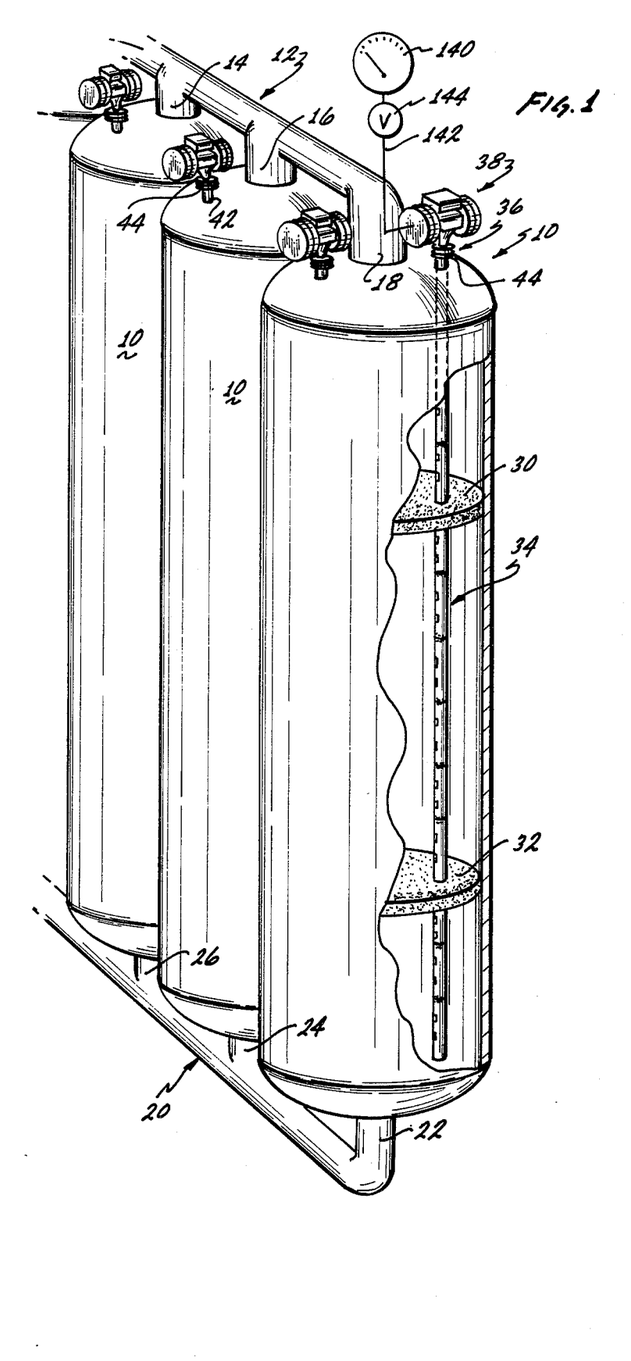
Figure 2:
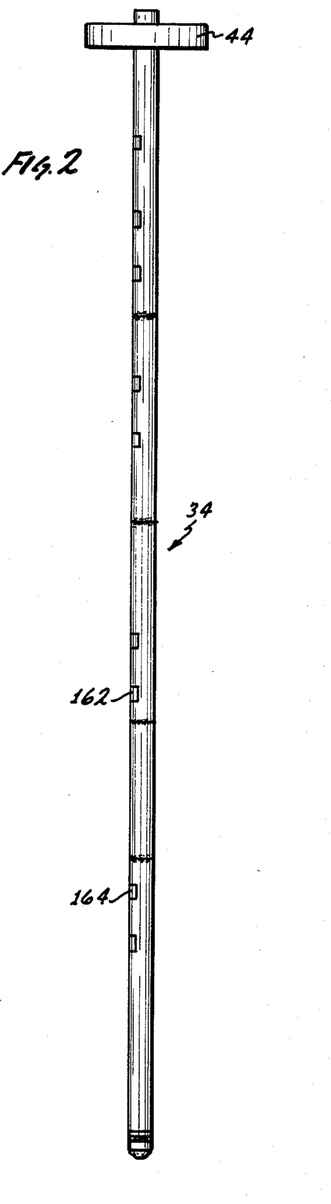
FIG. 2 shows a view of the conduit incorporating the thermocouples therein which extends downwardly into the pressure vessel.

FIG. 1 shows three high pressure chemical reaction vessels 10 having a manifold pipe 12 connected thereto by pipes 14, 16 and 18. At the base of the reaction vessels, a second manifold pipe 20 is shown connected by connection pipes 22, 24 and 26. The foregoing pipes or manifolds 12 and 20 can be used respectively for the inlet or the outlet of the reaction pressure vessels 10.

Generally speaking, petrochemicals pass into the pressure reaction vessels which can be in the form of a hydrocracker, hydrogen reactor, catalytic reactor, or catalytic cracker, or other numerous high pressure reaction vessels. The flow can be in either direction through the manifolds 12 and 20 so that flow can proceed through the manifold 12 downwardly through the reaction vessel and the pipes 14, 16 and 18 can be used as inlets with the pipes 22, 24 and 26 being used as the outlets. In the alternative, the flow can be initially from manifold 20 through pipes 22, 24 and 26 upwardly through the reaction vessels and outwardly through the manifold pipe 12 as connected by outlet pipes 14, 16 and 18.

Within the high pressure reaction vessels 10, are beds 30 and 32 that have been shown. A number of beds similar to beds 30 and 32 can be emplaced in numerous locations and at numerous levels in the reactor (interchangeably to be referred to herein as reaction vessel, or high pressure vessel). Also, other types of beds and materials can be emplaced therein wherein high pressure and high temperature reactions take place within the reactor.

In order to sense the reaction temperature at different levels and control the proper reaction rate, a number of thermocouples extend thereinto. As can be seen, a thermocouple conduit generally shown as pipe 34 has been shown. The thermocouple conduit 34 extends downwardly into the reaction vessel and terminates toward the base. Suffice it to say, it is not necessary that it terminate in any particular place, so long as it provides the thermocouple temperature sensing points.

The thermocouple conduit 34 extends upwardly and outwardly through a connection means generally shown at 36 into a containment chamber generally shown as containment chamber 38. This containment chamber 38 along with the terminals and outputs provide for the reading of the temperature at the temperature sensing points.

Figure 3:
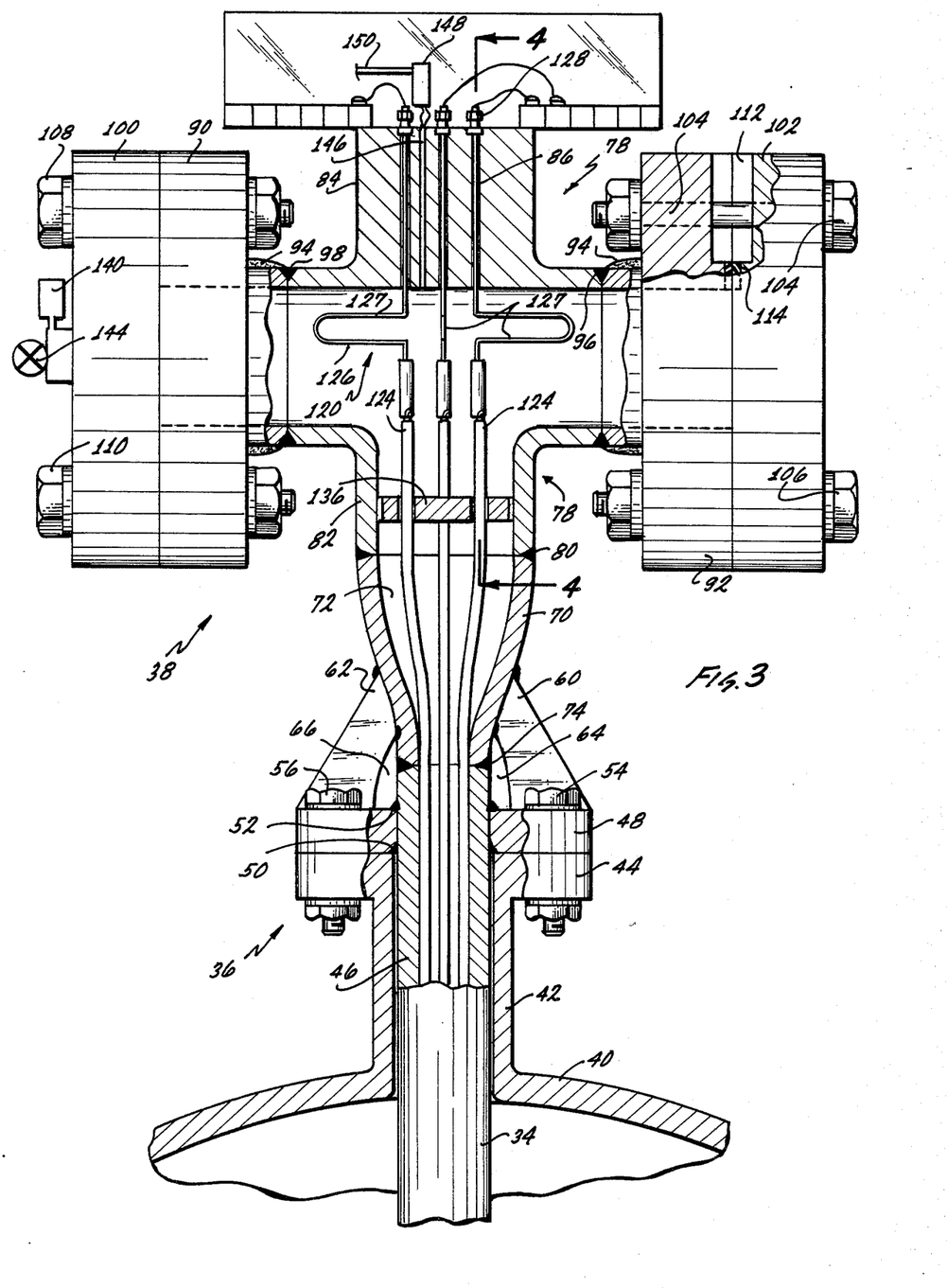
FIG. 3 shows a sectional view of the containment chamber at the upper portion of the pressure vessel that can be seen seated thereon.

Looking more particularly at FIG. 3, it can be seen wherein the thermocouple conduit 34 extends upwardly through a wall 40 of the reaction vessel. The conduit 34 passes through a neck 42 of the reaction vessel which has a flange 44 connected thereto. The flange 44 connected to the neck 42 is welded and part of the reaction vessel.

Numerous flanges and connection means can be utilized to connect the conduit 34 through the wall 40 of the reaction vessel into the inner portion of the reaction vessel. However, in this particular invention suffice it to say that any coupling means can be used for receiving a connection and passing outwardly through the wall 40 and connecting to the containment chamber of this invention. Thus, any suitable connection means for passing into the reaction vessel can be utilized so long as it secures the thermocouple conduit 34 thereinto.

Looking again at FIG. 3, it can be seen where the thermocouple conduit pipe 34 has a wall 46 which has been welded to a second flange 48 at weldments 50 and 52. The weldments 50 and 52 are such where they can circumferentially pass around the pipe 46 to weld it to the flange 48 around the edge thereof. In some cases where there is hydrogen in the vessel, it is desirable to have an escape of hydrogen through the weldment in order to avoid overpressures. This is accomplished by having the circumferential weld 52 extend only around the pipe a given distance with a space within the weldment. Thus, the complete circumference of the pipe 46 is not circumscribed by a wall, but in the alternative the weldment 52 is gapped to allow for the passage of hydrogen therethrough.

The flanges 44 and 48 are secured by means of bolts 54 and 56, as well as other bolts surrounding the flanges 44 and 48 with holes passing therethrough in order to secure them therein. The bolts 54 of course have nuts at the ends of them in order to provide for a tightened turndown of the flanges 44 and 48 which can have a suitable gasket or seal emplaced therebetween.

The flange 48 has four upstanding webs formed at quadrants, such as gussets 60 and 62 and two which are not shown. The gussets 60 and 62, as well as the other two that are not seen, have a space 64 and 66 spacing the gussets 60 and 62, in order to prevent a weld against a weld such as the weld 52 and a second weld 74 holding the pipe wall 46.

The gussets 60 and 62 as previously stated, and spaces 64 and 66 are all for the avoidance of a weld on a weld which is undesirable for high pressure vessels.

In order to provide for a connection of the pipe wall 46 to the upper portion of the containment chamber, the pipe wall 46 is welded to a concentric reducer 70. The concentric reducer 70 bells outwardly and provides a space 72 therein through which the thermocouples in their tubes can pass.

The concentric reducer 70 is welded to the wall 46 at a weldment 74. Thus, with the space 64 and 66, the gussets 60 and 62 are not welded directly to a weld such as weld 74 of the concentric reducer, thereby avoiding the problem of a weld on a weld as previously alluded to.

The concentric reducer 70 passes upwardly and is connected to a cross member 78 at a weldment 80. The cross member 78 is generally shown in the FIG. 1 showing as the containment chamber 38 in part with an open space or chamber 120 therein. This cross member 78 can be formed as a T by eliminating one side thereof as will be set forth hereinafter.

The walls of the cross member 78 are shown in the form of wall portions 82 forming the cross, while the upper portion instead of forming a center wall portion, such as wall 82, is provided with a substantially thick block portion 84. The block portion 84 has holes 86 tapped therein which receive the thermocouples in the manner as will be set forth hereinafter.

Looking at the lateral portions of the cross which can be seen formed of the walls 82 on either side of the cross, it can be seen that a flange 90 on one side and a second flange 92 on the other side is shown. The flanges 90 and 92 are joined to the cross by means of weldments 96 and 98.

Attached to the respective flanges 90 and 92, are mating flanged covers or caps 100 and 102. The mating flanged covers or caps 100 and 102 are secured by bolts, such as bolts 104 and 106 securing the flange covers 102 to the flange 92, as well as second bolts 108 and 110 securing the cover 100 to the flange 90. It should be understood that a plurality of bolts at least four in number generally circumscribe the flanged connection, namely flange 90 and 92 in their respective connections to flanges 102 and 100. The flanges and mating flanges should have a suitable gasket or seal emplaced between them.

In order to seal the mating flanged covers 100 and 102 to the flanges, it can be seen in a sectional view of flange 92, that the bolt 104 passes therethrough into a spaced area 112. The space 112 permits a seal at a portion 114 of the flange and cover. This seal 114 seals the cover 100 and 102 to the flanges.

The cross 78 provides a substantial containment chamber in the form of chamber 120. Chamber 120 can be formed as the cross or on the basis of a T with the chamber having a substantial area within the transverse portion of the T. For instance, either the flange 90 or flange 92 can be eliminated with its respective mating flanged cover and space leading thereinto so that a T is formed which accommodates the requirement of a chamber 120 within the area defined by the chamber of the cross. Stated another way, the showing is of a cross with a chamber 120 having the flange 90 and mating flanged cover 100 or flange 92 and mating flanged cover 102 in which one set of flanges 90 and 100 or 92 and 102 can be eliminated in the T configuration when only one flange and mating flange are utilized to provide the chamber 120.

The containment chamber 120 receives a plurality of tubes 124 which extend through the pipe 34. The tubes 124 received the thermocouples therein which are shown extending out of the tubes 124 and are bent at a bend 126 and extend upwardly through the tapped openings 86 through a number of compression fittings 128 screwed on top of and into the block 84.

In order to provide for spacing of the tubes 124 as they pass into the concentric reducer 70, a spacer 136 is shown having openings 138 through which the tubes 124 pass. The spacer 136 is spaced from the wall 82 sufficient to allow it to move upwardly and downwardly when the tubes 124 expand and contract. The spacer likewise is not welded since the tubes expand and contract in differing amounts.

The tubes 124 when emplaced in the conduit 34 move upwardly and downwardly in the conduit due to the expansion and contraction, based upon the change of temperature during the cycle. In order to accommodate this, the tubes 124 holding the thermocouples, are driven by spring loaded retainers that will be expanded upon hereinafter.

Returning to the containment function, if the wall 46 of the conduit 34 has its containment integrity thereof comprised in some manner and pressure extends through the conduit 34 into the space 120 of the chamber, it is well to monitor this pressure. In order to do this, a gauge 140 is shown connected by a line 142 to the cover 100 and through the mating flanged cover 100 into the area of the chamber. This allows for pressure to be read from gauge 140. Excess pressure can be valved by means of a valve 144 bleeding off the excess pressure therefrom.

In order to further monitor the presure within chamber 120, a probe 146 is shown extending through the block 84 for monitoring the pressure of the chamber 120. This probe 146 extending downwardly is connected to an output means 148 which monitors the pressure in chamber 120 and transmits it on a line 150 to a remote location for monitoring the pressure in the chamber 120. This is so that in the event there is a leak through the pipe 34 into the containment chamber 120, it can be monitored and appropriate measures taken.

As previously stated, the pipe 34 expands and contracts with the tubes 124 therein. The attendant problem therewith is to maintain good contact of the tubes 124 with the thermocouples for purposes of monitoring temperature along the pipe 34. This is accomplished in the manner that will be set forth hereinafter.

Figure 7:
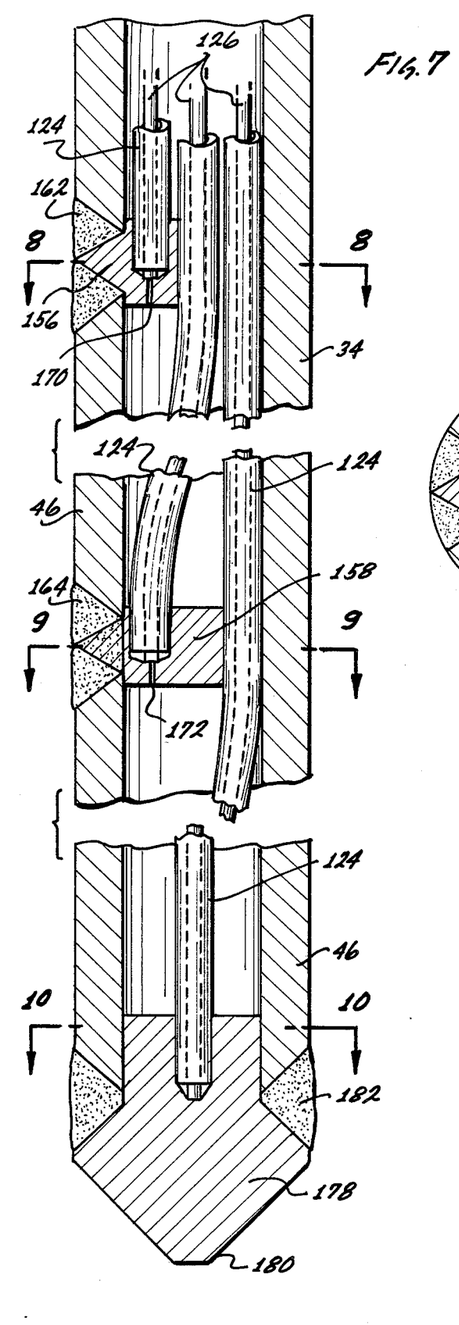
FIG. 7 shows a sectional view of the thermocouple conduit and related structure as taken along fragmented areas of the conduit shown in FIG. 2.

Looking particularly at the pipe 34 seen in FIG. 7, it can be seen that a number of blocks 156 and 158 are shown. The blocks 156 and 158 have been welded into the side of the wall 46 of the pipe 34 by means of them protruding in the case of one shown in that of the temperature sensing block 156. Block 158 is shown flush with an opening through the wall 46 of the pipe 34. The temperature sensing blocks 156 and 158 are spaced along the pipe 34 and have only been shown two in number and are representative of those temperature sensing blocks seen at weldments 162 and 164 in the pipe 34. Thus, it is apparent that the weldments 162 and 164 as shown are weldments which are against the temperature sensing blocks 156 and 158 to provide for the temperature sensing.

The temperature sensing blocks or members 156 and 158 each respectively have a drain hole 170 and 172 to drain water gathering on the upper surfaces of the blocks. These drains allow condensation, or any water on the blocks to be drained. The blocks can be substituted by any other contact or temperature sensing members between the thermocouples 126, and the pipe 34.

FIG. 7 shows at the end of the pipe 34, a plug 178. The plug 178 is generally pointed at point 180. The plug 178 is welded to the pipe wall 46 by means of a weldment 182. The plug 178 has a drilled opening which receives one of the tubes 124.

The tubes 124 are shown passing into the respective blocks 156 and 158 which form the temperature sensing blocks with the last of them passing into the plug 178. For purposes of detail, the tubes 124 shall be set forth hereinafter. Suffice it to say, they are of a larger diameter than the thermocouples passing thereinto, namely, thermocouples 126 as shown in the various sectional FIGS. 8, 9 and 10.

Figure 8:
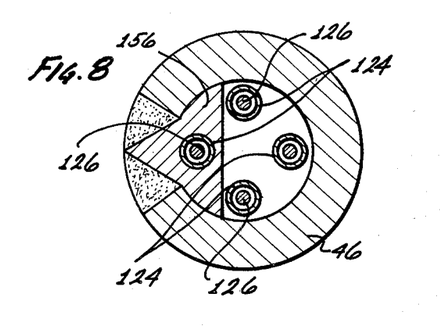
FIG. 8 shows a sectional view looking downwardly at the conduit and thermocouples in the direction of lines 8—8 of FIG. 7.
Figures 9, 10:
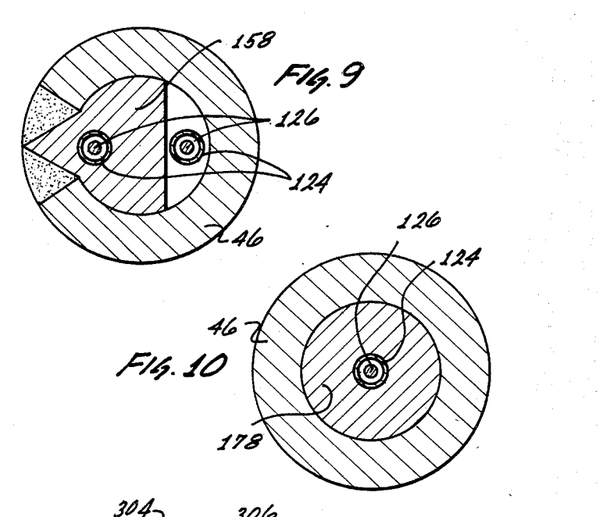
FIG. 9 shows a sectional view of the thermocouples within the conduit shown in the direction of lines 9—9 of FIG. 7.
FIG. 10 shows a sectional view of the end of the conduit with a thermocouple therein as seen in the direction of lines 10—10 of FIG. 7; and, FIG. 11 shows a detailed view of the thermocouples when emplaced within the thermocouple sheath.

Looking more particularly at FIG. 8, it can be seen that the temperature sensing block or member receives a tube 124 passing thereinto with a thermocouple 126. This is secured downwardly against the block so that it engages the temperature sensing block 156 in contacting relationship against the base of the opening therein, as can be seen in FIG. 7. This contact must be maintained as the pipe 34 and the thermocouple tubes 124 expand upwardly and downwardly. As an alternative, the tube 124 can be welded to heat transfer block 156.

As previously shown and as can be understood, the tubes 124 must be able to expand upwardly and downwardly and thermocouple 126 contained therein must be seated against the temperature sensing blocks 156, 158 and also in the base plug 178. This is accomplished generally within the framework of the showings of FIGS. 4, 5 and 6.

Figure 4:
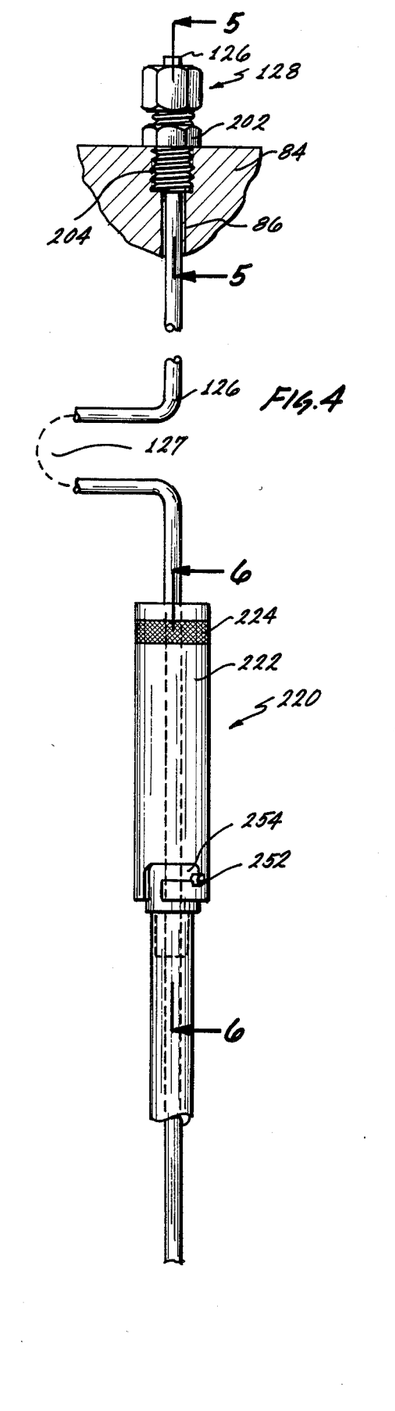
FIG. 4 shows a partially sectioned view in the direction of lines 4—4 of FIG. 3 detailing a thermocouple and its mounting.
Figure 5:
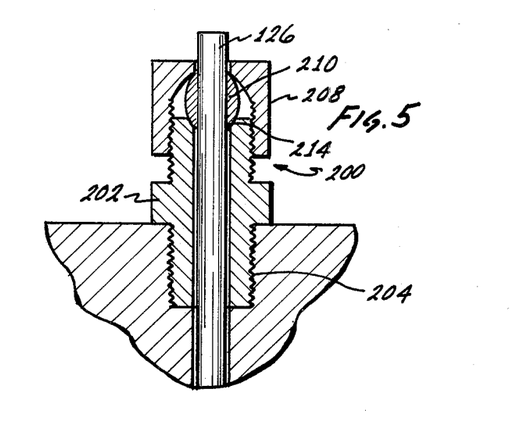
FIG. 5 shows a sectional view of the high pressure fitting of FIG. 4 in the direction of lines 5—5 of FIG. 4.
Figure 6:
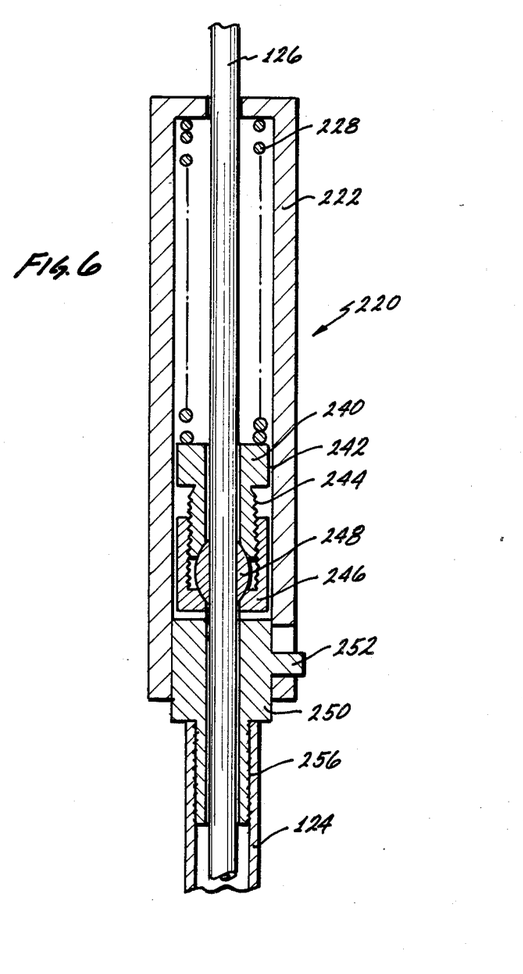
FIG. 6 shows a sectional view of the spring retainer body and thermocouple passing therethrough as seen in the direction of lines 6—6 of FIG. 4.

In particular, it can be seen that FIGS. 4, 5 and 6 show the area in the upper portion of the containment chamber 120. The showing is of pressure fittings 128 which pass into the block 84 down through the openings 86. The pressure fittings 128 comprise a body portion 200 of the pressure fitting having a hexnut portion 202 thereof which allows it to be threaded downwardly into the block 84 by means of threads 204. The threads 204 are national pipe threads (N.P.T.) which provide a high pressure seal between pressure fitting 128 and block 84.

A cap 208 is shown with a ferrule 210 surrounding the thermocouple 126. The thermocouple 126 is held in tightened juxtaposition by the impressment of the cap 208 against the ferrule 210 so that it secures it tightly against the body of the compression fitting 202. The body of the compression fitting 202 receives the ferrule 210 by means of a tapered surface 214 in which the ferrule is seated and impressed by the cap 208 impressing it thereagainst.

The foregoing configuration thereby seals the thermocouple 126 into the block 84 in a tightened manner to prevent escapement of pressure from the containment chamber 120. It should be understood that any particular type of securement of the thermocouple 126 can be used to secure it within the block 84 or into any wall in which the containment chamber 120 is formed and through which the thermocouples pass.

The thermocouples 126 are held by a spring retainer 220. The spring retainer 220 comprises a spring retainer cap 222. The spring retainer cap 222 has a knurled portion 226 thereon that allows the spring retainer cap 222 to be pushed downwardly and seated with a bayonet fitting as will be described hereinafter.

The cap 222 in the sectional showing of FIG. 6 can be shown having a spring 228 therein. The spring 228 is such that it forces the thermocouple 126 downwardly through tube 124 so that the ends thereof are seated against the respective temperature sensing blocks, such as blocks 156 and 158.

In order to provide a grip on the thermocouple 126, a spring retainer 240 is shown spaced by space 242 from the interior walls of the cap 222. The spring retainer body 240 is threaded at threads 244 into the interior threads of the cap 246. The interior threads of the cap 246 when threaded tightly against the threads 244 of the spring retainer body 240 allow a ferrule 248 to be compressed against the thermocouple 126. Thus, the ferrule 248 tightly engages the thermocouple 126 to allow the spring 228 to push downwardly thereagainst within the cap 222.

The bayonet attachment 250 has a pin 252 extending therefrom that is received within a slot 254 to secure the cap 222 thereagainst. This enhances the entire function of the cap 222 in a manner whereby it is first of all pushed downwardly and seated within the slot and turned so that the pin 252 is received therein and the pressure of the spring 228 can then push against the spring retainer body 240 so as to move the thermocouple 126 downwardly and seat it tightly through the tube 124 against the temperature sensing blocks as previously set forth.

In order to complete the connection of the bayonet attachment 250 to the tube 124, a welded or silver brazed connection 256 is provided. Thus, the bayonet attachment 250 is attached to the tube 124 and thermocouple 126 is allowed to be driven downwardly by the spring action of spring 228 through the tube 124.

As can be appreciated, the bend in the thermocouple 126 as seen at bend 127 allows the thermocouples to expand and contract within the chamber 120 for expansion and contraction through the tubes 124. The overall effect is to provide for the expansion and contraction of the combination, while at the same time maintaining the thermocouples 126 tightly against the base of the temperature sensing blocks through which vessel temperatures can be monitored by the thermocouples.

Figure 11:
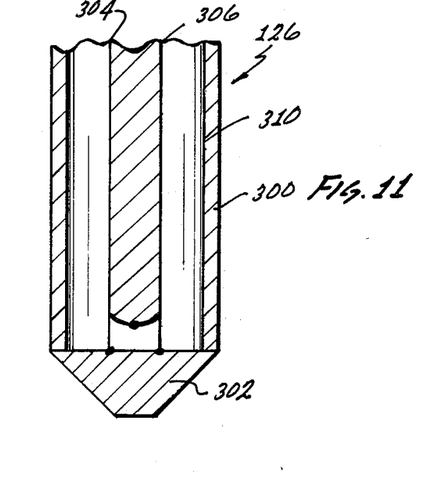

For purposes of explanation, FIG. 11 has been included herewith to show a thermocouple. In particular, the thermocouple 126 is shown with a wall 300. The wall 300 of the thermocouple is closed at the end with a closure 302 and receives thermocouple leads 304 and 306 therethrough. The thermocouple leads 304 and 306 meet at the junction point of the closure 302 to function in the way of a normal thermocouple so that differences in temperature can be monitored and sensed by providing an electrical output through the thermocouple. The leads 304 and 306 are insulated from the sheath 300 and from each other by means of a hard-packed inorganic material 310 which has been shown within the sheath 300. Once the thermocouple leads 304 and 306 are emplaced therein, the leads 304 and 306 are generally maintained in place and can be bent in the manner shown of the bends 127.

As can be appreciated, the foregoing thermocouples 126 can be replaced with resistance temperature detectors or any other suitable detectors. The breadth of this invention is to provide for the containment chamber to allow the ease of access for servicing the thermocouples or leads that pass into the chamber through the covers 100 and 102, while at the same time providing for safety and the containment of pressures if they pass through the weldments, such as weldments 162 and 164, or the pipe itself deteriorates and leaks.

As a consequence of all the foregoing, this invention should be read broadly as a step over the prior art with respect to pressure containment means and thermocouples and probes within reactors of the type set forth hereinbefore.

We claim:

1. A temperature sensing apparatus for use with a vessel such as of the type used in the petrochemical and petroleum refining industry wherein said temperature sensing apparatus is emplaced within said vessel and communicates externally therefrom comprising:
   conduit means for extending into a vessel having temperature sensing members;
   means for securing and sealing said conduit means within said vessel by providing a first pressure sealing means;
   temperature sensing means extending into said conduit means;
   a containment chamber connected to said conduit means to allow said temperature sensing means to extend from said conduit into said containment chamber;
   means to extend said temperature sensing means externally from said containment chamber while at the same time providing a second pressure sealing means for sealing the interior of the containment chamber from the environment;
   means formed as a high pressure removable cover to provide access to the interior of said containment chamber for servicing said temperature sensing means;
   means for providing contact between said temperature sensing means to said temperature sensing members of said conduit comprising a spring biased force urging said temperature sensing means against said temperature sensing members; and wherein said first and second pressure sealing means and said high pressure removable cover are designed to withstand the internal pressure of the vessel to reduce the risk of a blowout.

2. The apparatus as claimed in claim 1 wherein said means for providing spring bias and contact of said temperature sensing means against said temperature sensing members comprise:
   a spring means held by a member that is adapted for positioning within a fixed relationship;
   means connected to said temperature sensing means and said spring means to allow said spring means to urge said temperature sensing means against said temperature sensing members; and,
   wherein said temperature sensing members comprise blocks welded to said conduit.

3. The apparatus as claimed in claim 1 wherein:
   said access means to said containment chamber comprises a bolted cover to said containment chamber.

4. The apparatus as claimed in claim 3 wherein:
   said access means to said containment chamber is formed with a flange having an opening therethrough; and,
   wherein said bolted cover is a plate for bolting to said flange by a plurality of bolts securing said plate to said flange to provide access into said containment chamber.

5. The apparatus as claimed in claim 4 further comprising:
   means for conducting said temperature sensing means from said containment chamber in the form of openings provided in the wall of said containment chamber; and,
   high pressure fittings for securing said temperature sensing means into the wall of said containment chamber.

6. The apparatus as claimed in claim 1 further comprising:
   flange means connected to said conduit for connection to and seating against a second flange means of said vessel.

7. The apparatus as claimed in claim 6 further comprising:
   a pressure probe extending into said containment chamber; and,
   means for monitoring the pressure within said containment chamber.

8. An apparatus for sensing temperatures within a vessel such as a hydrocracker, catalytic reactor or catalytic converter having a passage thereinto for the receipt of a temperature sensing apparatus wherein said temperature sensing apparatus comprises:
   a conduit for extending substantially into said vessel and having a closed end to said conduit within said vessel;
   means for connecting said conduit in sealed relationship to the passage passing into said vessel by providing a first pressure sealing means;
   at least one temperature sensing means passing into said conduit for sensing temperatures within said vessel;

at least one member which has been welded to said conduit which can sense temperatures in said vessel and which is in contact with said temperature sensing means;

a containment chamber connected to said conduit externally from said portion of said conduit extending into said vessel, having walls which define said chamber;

passage means extending into said containment chamber for allowing service of said temperature sensing means which extend into said containment chamber;

means within the walls of said containment chamber for conducting said temperature sensing means externally of said containment chamber while at the same time providing a second pressure sealing means for sealing the interior of the containment chamber from the environment;

means formed as a high pressure removable cover for closing said passage means extending into said containment chamber;

means for spring biasing said temperature sensing means into contact with said temperature sensing members; and wherein said first and second pressure sealing means and said high pressure removable cover are designed to withstand the internal pressure of the vessel to reduce the risk of a blowout.

9. The apparatus as claimed in claim 8 wherein:
said containment chamber is formed as a chamber having more than one passage into said chamber.

10. The apparatus as claimed in claim 9 wherein:
said temperature sensing members are welded into said conduit and contain an opening into which said temperature sensing means are placed in contact therewith.

11. The apparatus as claimed in claim 10 wherein:
said passage from said vessel has a flange connected thereto; and
said means for connecting said containment chamber to said conduit comprises a flange connected to said conduit for sealing engagement of said flange in connected relationship to the flange of the passage from said vessel.

12. The apparatus as claimed in claim 11 further comprising:
electrical terminal means outside of said containment chamber in proximate relationship to said means for conducting said temperature sensing means from said chamber for connection of said temperature sensing means to said terminals.

13. The apparatus as claimed in claim 11 further comprising:
an expanded concentric reducer attached to said conduit and connected to said containment chamber;
gusset means for supporting said concentric reducer to said flange means connected to said conduit;
spacing means for spacing said temperature sensing means as they pass from said containment chamber in the direction of said concentric reducer.

14. The apparatus as claimed in claim 13 further comprising:
means for sealing said temperature sensing means in the form of a high pressure fitting having a ferrel and cap arrangement for sealing said ferrel by the cap against the temperature sensing means and further comprising second means against which said ferrel is seated which is in sealed contact with the wall of said containment chamber.

15. The apparatus as claimed in claim 14 further comprising:
a tube surrounding said temperature sensing means:
means for seating said tube within said temperature sensing members to allow said temperature sensing means to receive temperature gradients from said temperature sensing members that have been welded to said conduit;
means for connecting said spring biasing means to said tube for said temperature sensing means;
means for securing a stop on said temperature sensing means for receipt of the spring bias of said spring biasing means so as to drive said temperature sensing means within said tube.

16. The apparatus as claimed in claim 15 wherein said spring biasing means further comprise:
a bayonet type cap for seating and locking with said tube means; and,
wherein said locking means of said temperature sensing means comprise a ferrule and a cap for said stop which is such wherein it causes said ferrule to grip said temperature sensing means and allow said spring biasing means to drive said cap and ferrule with said temperature sensing means through said tube.

17. The combination of a pressure vessel and temperature sensing means for said pressure vessel comprising:
a pressure vessel having walls within which a reaction is to take place at a desired temperature;
means for introducing a material that is to be reacted within said reaction vessel;
means for allowing the exit of said material that is reacted within said reaction vessel;
passage means passing into said reaction vessel;
a conduit extending through said passage means into said reaction vessel and extending from said passage means outwardly;
means for securing said conduit in sealed relationship within said passage means by providing a first pressure sealing means to prevent pressurized materials from passing from said reaction vessel through said passage in which said conduit is secured;
a containment chamber having walls in connected relationship to said conduit;
a tube having temperature sensing means therein passing through said conduit into said reaction vessel, and placed within said containment chamber;
means to extend said temperature sensing means externally from said containment chamber while at the same time providing a second pressure sealing means for sealing the interior of the containment chamber from the environment;
temperature sensing members connected to the walls of said conduit into which said temperature sensing means are placed in contact;
at least one opening passing through the wall of said containment chamber for access to the interior of said containment chamber
high pressure covering means for covering the opening of said containment chamber; and wherein,
said temperature sensing means in said tube is spring biased through said tube by spring means biasing said temperature sensing means into contact with said temperature sensing members and said first and second pressure sealing means and said high pressure covering means are designed to withstand the internal pressure of the vessel to reduce the risk of blowout.

18. The combination as claimed in claim 17 wherein: said opening passing into said containment chamber is covered with a metal plate secured to the walls of said containment chamber by bolts.

19. The combination as claimed in claim 18 further comprising:
flange means surrounding the opening passing into said containment chamber to which said metal plate is secured for providing the closure to said containment chamber.

20. The combination as claimed in claim 19 further comprising:
flange means surrounding said passage of said reaction vessel through which said conduit means having said temperature sensing means therein extends;
second flange means connected to said conduit for seating and sealing engagement with said flange means around said passage so that bolts can be connected between said first and second flange means for securing said conduit within said passage of said reaction vessel.

21. The combination as claimed in claim 20 further comprising:
means for sensing pressure within said containment chamber; and,
means for indicating said pressure within said containment chamber.

22. The combination as claimed in claim 21 further comprising:
openings through said containment chamber walls for passing said temperature sensing means externally of said containment chamber; and,
pressure fittings for securing said temperature sensing means within the openings passing from said containment chamber.

23. The combination as claimed in claim 22 further comprising:
spring biasing means secured to said tubes surrounding said temperature sensing means for engaging said temperature sensing means and causing said temperature sensing means to be driven directionally through said tubes toward said temperature sensing members.

24. The combination as claimed in claim 23 wherein:
said spring biasing means comprise a bayonet attachment to said tube and a cover for securement to said bayonet attachment on said tube having a spring therein; and,
a retainer body with a ferrel therein which is received within a cap and said spring retainer body with thread means between said cap and spring retainer body so that as said spring retainer body is threaded into said cap, it causes said ferrel to engage said temperature sensing means and wherein the spring within said cover can be driven internally thereof against said spring retainer body for driving said temperature sensing means downwardly through the tube.

25. The combination as claimed in claim 24 further comprising:
a concentric reducer extending between said conduit and said containment chamber; and,
gusset means for supporting said concentric reducer against said flange for connection between said reaction vessel and said conduit.

26. The combination as claimed in claim 25 further comprising:
temperature sensing members formed as blocks welded to the wall of said conduit;
openings within said temperature sensing blocks for receipt of the tube and the temperature sensing means within said conduit so that as said temperature sensing means are biased downwardly against said temperature sensing blocks, they can sense temperature gradients from said temperature sensing blocks; and wherein,
said temperature sensing blocks are formed in part to follow the interior dimension of said conduit and wherein said temperature sensing means comprise a thermocouple extending through said tube and terminating in a junction for sensing temperatures at said temperature sensing block.

27. The combination as claimed in claim 26 wherein: said thermocouples are made of wires within a sheath and are insulated by means of a packed inorganic material therebetween so as to provide insulation between the respective wires of said thermocouple and the sheath for said thermocouple.

* * * * *